(No Model.)

E. THOMSON.
ELECTRIC MEASURING INSTRUMENT.

No. 537,500. Patented Apr. 16, 1895.

WITNESSES.
A. F. Macdonald.
B. B. Hull.

INVENTOR.
Elihu Thomson, by
Geo. R. Blodgett,
Atty.

UNITED STATES PATENT OFFICE.

ELIHU THOMSON, OF SWAMPSCOTT, ASSIGNOR TO THE THOMSON-HOUSTON ELECTRIC COMPANY, OF BOSTON, MASSACHUSETTS.

ELECTRIC MEASURING-INSTRUMENT.

SPECIFICATION forming part of Letters Patent No. 537,500, dated April 16, 1895.

Application filed October 26, 1894. Serial No. 527,082. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Measuring-Instruments, of which the following is a specification.

My invention relates to electric measuring instruments; and has for its object to provide a simple, accurate and cheap instrument adapted for the measuring of current, working upon the astatic principle, thus making it adaptable to station switch-boards and other places where stray fields are apt to affect the correctness of instruments of ordinary construction.

In another application for patent filed by me, of even date herewith, bearing Serial No. 527,081, I have illustrated a voltmeter operating upon the same principles as the instrument herein described. I do not wish therefore in this case to make any claim broad enough to cover the construction of that instrument, but only to claim modified forms embodying the principles of that case, but adapted to the measurement of current. I have described and illustrated herein a shunt ammeter, but I do not mean to limit myself in this particular, as I may employ, if desired, an ammeter utilizing the entire current, but inasmuch as such a construction would be large and costly, the instrument in its illustrated form is much to be preferred.

In the accompanying drawings I show an embodiment of my invention.

Figure 1:
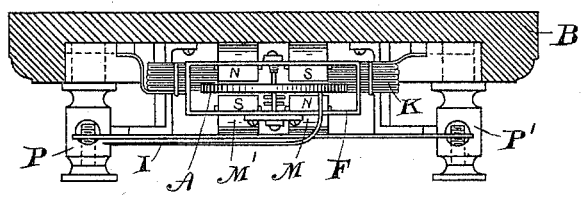
Figure 2:
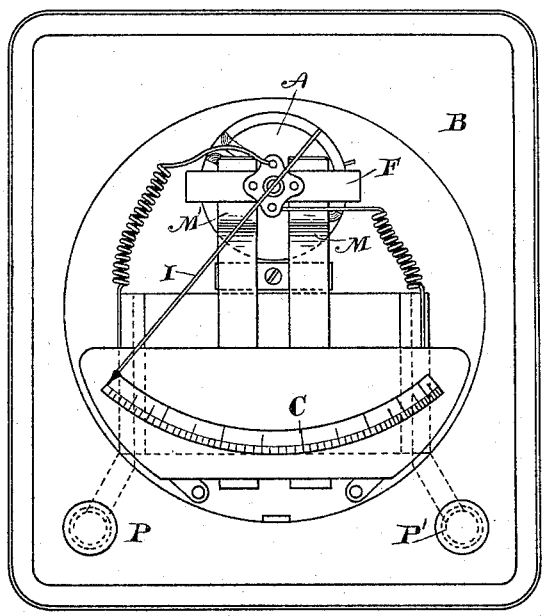
Figure 3:
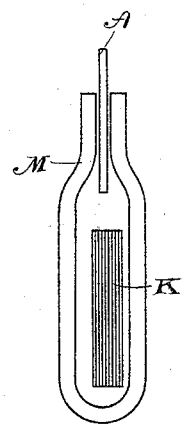
Figure 4:
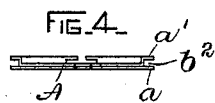
Figure 5:
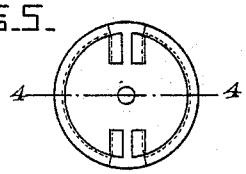
Figure 6:
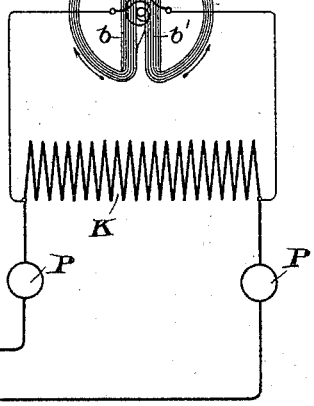

Figure 1 is a plan with the base in section. Fig. 2 is a front elevation; Fig. 3, a side elevation illustrating the shape of the magnet which I employ, the shunt coil being in section. Figs. 4 and 5 are details of the bobbin or wheel carrying the moving coils. Fig. 6 is a diagram of the connections; and Fig. 7 is a modified form adapted to a portable instrument.

In Figs. 1 and 2, magnets M, M' are shown secured to the base B by any suitable means. These magnets are alternated in position; that is to say, the south pole of one and the north pole of the other are respectively next to the base-board B, thus giving an astatic balance to the magnetic field, and preventing the action of stray fields upon the instrument. The wheel, disk, or bobbin A is composed of good conductor non-magnetic metal such as copper, and acts as a damping disk to prevent oscillations of the needle or index I. This wheel or bobbin is best shown in Figs. 4 and 5, Fig. 4 being a section upon the line 4—4 of Fig. 5, and in the case illustrated is formed of two parts, a complete disk $a$ forming its base, and the coil-retaining portion $a'$ arranged so as to form the coil chambers $b^2$, being secured to the base. The coils are wound in the form shown in Fig. 6, and are like those shown in the companion case already referred to. As illustrated in Fig. 6, the coil is in shunt between the mains X, Y, and the current entering at the binding post P passes partly through the coils A', A², and partly through the shunt coil K, which is, as shown in Figs. 1 and 3, preferably composed of a strip of copper doubled upon itself so that it does not create any magnetic field, inasmuch as the current passes first in one direction and then in the other. After passing through the coils upon the bobbin and the shunt coil, the current leaves the instrument at the binding post P'.

Figure 7:
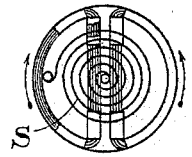

Referring to Fig. 7, I illustrate a modification adapting the instrument for use as a portable appliance; and therein I employ a spiral spring S, to preserve the balance of the needle, and to keep it at zero when no current is passing.

Referring to Fig. 3, I show how the shunt coil $k$ may be arranged within the magnets M, M', thus making the instrument more compact, though otherwise its situation is unimportant.

It is important that the coils A', A² and the shunt coil K should have substantially the same temperature coefficient, and therefore the section of metal employed must be sufficient to convey the current without undue heating, which will give a substantially constant relation between the two. The bobbin or carrier A is mounted, as in the case already referred to, in a yoke F of non-magnetic material so that the central straight portions $b$, $b'$ of the coils A', A² are parallel, and I convey the current to the coils by any means which will not retard their rotation.

These straight portions are mounted, as best shown in Fig. 2, so as to be angularly displaced in the magnetic field, and as they rotate under the influence of the current passing in them, torque is developed by their cutting of the lines of force in direct proportion to the amounts of current passing. By their rotation they move the needle I over the scale C, the graduations of which are such as to correspond to the current, as is well understood in the art.

What I claim as new, and desire to secure by Letters Patent of the United States, is—

1. In an ammeter, a pair of magnets having their poles of unlike signs opposed to one another, a non-magnetic bobbin rotating in the magnetic field, coils carried by the bobbin, a circuit through the coils conveying the current to be measured, and a shunt across such circuit composed of a folded ribbon of conducting material.

2. In an ammeter, a pair of horse-shoe magnets having their poles of unlike signs opposed to one another, a non-magnetic bobbin rotating in the magnetic field, coils carried by the bobbin, a circuit through the coils conveying the current to be measured, and a shunt across such circuit composed of a folded ribbon of conducting material disposed in the loops of the horse-shoes.

3. In an ammeter, a pair of magnets having their poles of unlike signs opposed to one another, a non-magnetic bobbin rotating in the magnetic field, coils carried by the bobbin, the coils wound with straight portions adjacent to each other and at an angle to the lines of force, a circuit through the coils conveying the current to be measured, and a shunt across such circuit composed of a folded ribbon of conducting material.

4. In an ammeter, a pair of horse-shoe magnets having their poles of unlike signs opposed to one another, a non-magnetic bobbin rotating in the magnetic field, coils carried by the bobbin, the coils wound with straight portions adjacent to one another and at an angle to the lines of force, a circuit through the coils conveying the current to be measured, and a shunt across such circuit composed of a folded ribbon of conducting material disposed in the loops of the horse-shoes.

5. In an ammeter, a pair of magnets having their poles of unlike signs opposed, a non-magnetic bobbin rotating in the magnetic field against an opposing force, coils carried by the bobbin, a circuit through the coils conveying the current to be measured, and a shunt across such circuit composed of a folded ribbon of conducting material disposed in the loop of the magnets.

6. In an ammeter, a pair of magnets having their poles of unlike signs opposed, a non-magnetic bobbin rotating in the magnetic field against an opposing force, a coil composed of two smaller coils laid side by side, each having a straight portion, the straight portions arranged adjacent to one another and wound in the same direction, a circuit through the coils conveying the current to be measured, and a shunt across the circuit.

7. In an ammeter, a pair of magnets having their poles of unlike signs opposed, a non-magnetic bobbin rotating in the magnetic field, coils carried by the bobbin having straight portions adjacent to each other and wound in the same direction, each coil having a hollow space inclosed thereby, a circuit through the coils conveying the current to be measured, and a shunt across such circuit composed of a folding ribbon of conducting material.

In witness whereof I have hereunto set my hand this 24th day of October, 1894.

ELIHU THOMSON.

Witnesses:
JOHN W. GIBBONEY,
HENRY O. WESTENDARP.